Nov. 10, 1925.

H. LANGER

TIRE AND TIRE FABRIC

Filed March 6, 1923

Inventor:
Henry Langer,
by Emery, Booth, Janney and Varney
Attys.

Patented Nov. 10, 1925.

1,560,700

UNITED STATES PATENT OFFICE.

HENRY LANGER, OF MIDDLETOWN, CONNECTICUT, ASSIGNOR OF ONE-HALF TO THE I. E. PALMER COMPANY, OF MIDDLETOWN, CONNECTICUT, A CORPORATION OF CONNECTICUT.

TIRE AND TIRE FABRIC.

Application filed March 6, 1923. Serial No. 623,189.

*To all whom it may concern:*

Be it known that I, HENRY LANGER, a citizen of the United States, and a resident of Middletown, in the county of Middlesex and State of Connecticut, have invented an Improvement in Tires and Tire Fabrics, of which the following description, in connection with the accompanying drawings, is a specification, like characters on the drawings representing like parts.

This invention relates to vehicle tires and fabrics therefor, and particularly to pneumatic automobile tires of the cord reinforcement type.

In order that the principle of the invention may be readily understood, I have disclosed certain embodiments thereof in the accompanying drawing, wherein—

Heretofore vehicle tires, such as automobile tires of the pneumatic type, have been provided with cord reinforcements. In certain cases, said cords have had weft threads incorporated therewith so as to produce a woven structure, but so far as I am aware such structures have not been entirely satisfactory for reasons which will appear in the ensuing description of the tire fabric of my invention and the advantages incident thereto.

Figure 1:
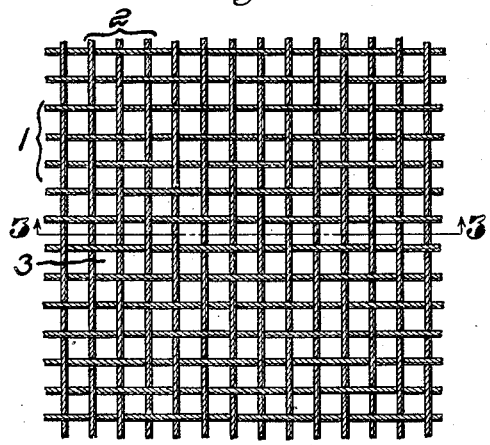
Fig. 1 is a plan view of a woven fabric peculiarly adapted for a vehicle tire of the type indicated.

I desirably employ warp and weft threads equal in number and of equal strength. In Fig. 1, I have shown the simplest form of my invention wherein the warp threads are indicated at 1 and the weft threads at 2. It will be noted that each warp thread passes over two weft threads, and then under two weft threads, and that each weft thread passes over two warp threads and then under two warp threads, and so on throughout the fabric. This is what is termed a twill weave and preferably it is of approximately square proportions, that is to say, it counts or contains about the same number of threads in the warp and in the weft.

Figure 2:
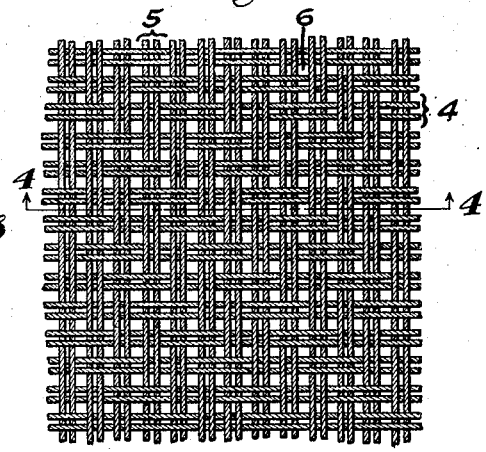
Fig. 2 is a similar view of a somewhat modified form of fabric also peculiarly adaptable for use for a vehicle tire.
Figure 3:
Fig. 3 is a transverse section upon the line 3—3 of Fig. 1.
Figure 4:
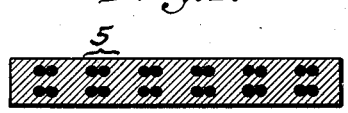
Fig. 4 is a transverse section upon the line 4—4 of Fig. 2.

Such a fabric, when applied to a tire, has peculiar advantages. Rubber or rubber compound of the tire passes freely through the multiplicity of small openings 3 throughout the entire fabric, and thus forms the complete body,—that is to say, the rubber upon one side of the fabric and the rubber upon the other side are connected through the multitudinous interstices of the fabric into an integral mass. In Fig. 2, I have shown a more developed form of my invention wherein the warp threads 4 are grouped in groups of two, and the weft threads 5 are likewise grouped in groups of two, in each case being close together, and each group is more widely spaced from the next group than are the members of each group. This provides the multiplicity of openings 6 characteristic of the fabric shown in Fig. 1, and minute quantities of the rubber or rubber compound find their way between each group and the adjacent group at either side, thus making a homogeneous mass of the entire material. It will be observed that each warp thread or group 4 passes over two wefts, and then under two wefts, and that each of the weft threads 5 or group thereof passes over two warps and then under two warps throughout the entire fabric.

Thus a characteristic feature of the fabric of Fig. 2 is the relatively close contact of the threads of a group, with sufficient spacing of the groups to permit the passage of a substantial amount of rubber or rubber compound. Moreover in each group the two threads, or a plurality of threads, whatever the number, always partake of the same path,—that is, they all pass over and all pass under the same warps or wefts as the case may be, by virtue of the twill formation.

Viewing both Figs. 1 and 2, it will be noted that while any one thread or group of threads passes over two warps or wefts, the next thread or group of threads passes over only one of said warps or wefts, and also over the next warp or weft, thus giving the characteristic diagonal or twill appearance.

I have discovered that with a fabric of the type herein shown, the fabric does not wrinkle when pulled or subjected to strain diagonally, and when applied to the metal core in building the tire, it will conform readily to the circular form of the tire core in the most perfect condition without any wrinkle, owing to the fabric being constructed on a twill basis which permits each group of warp and weft threads to assume freely the required position, producing a faultless tire. On the other hand goods woven on a plain weave basis will not adapt itself so well to the circular form required of a tire fabric. This is a feature of importance in the application of the fabric to a tire, as obviously any distortion of the fabric tends to disrupt the structure.

The fabric of my invention is held straight or square when being frictioned, this being a step preparatory to the building of a tire. When the tire is being built from my fabric, said fabric is applied by stretching it circumferentially as regards the tire, but diagonally or on the bias as regards the warp and weft of the fabric.

However, the fabric may be advantageously made use of either circumferentially or diagonally as the core may require.

Figure 6:
Fig. 6 is a cross section through a fabric showing a different grouping of the threads or strands from that shown in Figs. 1 and 2.

In Fig. 6, I have indicated still another form of my invention wherein the weft threads 7 are arranged in groups of three. Similarly, the warp threads are arranged in groups of three and each warp thread and each weft thread passes over two warps or two wefts in the manner characteristic of Fig. 2, and all the threads of each group are quite close together, being desirably in contact, and the groups are separated in the manner characteristic of the fabric of Fig. 2.

Figure 5:
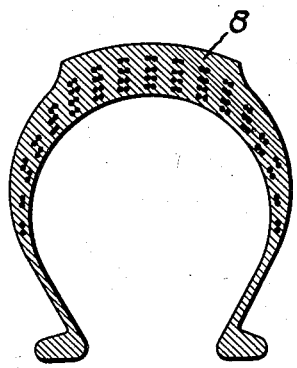
Fig. 5 is a transverse section of the outer casing of a vehicle tire having incorporated therein that form of fabric shown in Figs. 2 and 3.

In Fig. 5, I have illustrated the fabric of the type shown in Fig. 2 as applied to an outer shoe 8 of an automobile tire, it being noted that different widths of tire fabric are there employed, owing to the characteristic shape of the tire.

Having thus described one illustrative embodiment of my invention, I desire it to be understood that although specific terms are employed, they are used in a generic and descriptive sense and not for purposes of limitation, the scope of the invention being set forth in the following claims.

I claim—

1. A woven fabric for vehicle tires comprising warp threads and weft threads substantially equal in strength and in number in any given square section of the fabric, said warp and weft threads being interwoven at right angles to each other in units of one or more threads, each warp or weft unit passing alternately over and under a like plurality of units of the thread at right angles thereto and with successive parallel angles thereto and with successive parallel units arranged to produce a diagonal or twill weave, each unit of warp or weft being spaced from the next adjacent like units to provide a multiplicity of interstices throughout the entire fabric permitting the passage of the rubber or rubber compound in forming the tire and thereby to bind the material on the opposite sides of the fabric at said multiplicity of points to produce a unified structure, said fabric being adapted to stretch uniformly in the direction of its twill, diagonally or on the bias as regards its warp and weft units, without wrinkling and whereby it may conform more readily to the circular form of the tire when applied thereto with its said line of twill extending circumferentially of the tire.

2. A tire for vehicles having incorporated in the rubber or rubber compound structure thereof a plurality of layers of fabric, each such fabric layer comprising warp and weft threads substantially equal in strength and in number in any given square section of the fabric, said warp and weft threads being interwoven at right angles to each other in units of one or more threads, each warp or weft unit passing alternately over and under a like plurality of units of the thread at right angles thereto and with successive parallel units arranged to produce a diagonal or twill weave, each unit of warp or weft being spaced from the next adjacent like units to provide a multiplicity of interstices throughout the entire fabric permitting the passage of the rubber or rubber compound in forming the tire and thereby binding the material on the opposite sides of the fabric at said multiplicity of points to produce a unified structure, said fabric being adapted to stretch uniformly in the direction of its twill without wrinkling and being applied to the tire structure with its said line of twill extending circumferentially of the tire whereby it conforms more readily to the circular form thereof.

In testimony whereof, I have signed my name to this specification.

HENRY LANGER.